US008913982B2

(12) United States Patent  (10) Patent No.: US 8,913,982 B2
Eich  (45) Date of Patent: Dec. 16, 2014

(54) SYSTEM AND METHOD FOR EFFECTING SPECIAL TREATMENT OF EMERGENCY CALLS ORIGINATING FROM A TEMPORARILY DESIGNATED REGION

(75) Inventor: William J. Eich, Wheaton, IL (US)

(73) Assignee: West Corporation, Omaha, NE (US)

( * ) Notice: Subject to any disclaimer, the term of this patent is extended or adjusted under 35 U.S.C. 154(b) by 619 days.

(21) Appl. No.: 12/553,137

(22) Filed: Sep. 3, 2009

(65) Prior Publication Data

US 2011/0053551 A1    Mar. 3, 2011

(51) Int. Cl.
*H04M 11/04*    (2006.01)
*H04W 4/22*    (2009.01)
*H04W 76/00*    (2009.01)

(52) U.S. Cl.
CPC .............. *H04W 4/22* (2013.01); *H04W 76/007* (2013.01)
USPC ................................. 455/404.2; 379/221.03

(58) Field of Classification Search
USPC ............. 455/404.1–404.2, 414.1–414.4, 440, 455/456.1–457; 370/229–238.1, 352; 379/211.01, 221.01–221.03, 309, 379/37–51
See application file for complete search history.

(56) References Cited

U.S. PATENT DOCUMENTS

| | | | |
|---|---|---|---|
| 5,249,223 A | | 9/1993 | Vanacore |
| 5,323,444 A | * | 6/1994 | Ertz et al. .......................... 379/45 |
| 5,815,808 A | | 9/1998 | Valentine |
| 6,233,445 B1 | * | 5/2001 | Boltz et al. .................. 455/404.2 |
| 6,332,022 B1 | * | 12/2001 | Martinez .................. 379/220.01 |
| 6,415,018 B1 | | 7/2002 | Antonucci et al. |
| 6,529,722 B1 | * | 3/2003 | Heinrich et al. ........... 455/404.1 |
| 6,622,016 B1 | | 9/2003 | Sladek et al. |
| 6,819,929 B2 | | 11/2004 | Antonucci et al. |
| 6,868,410 B2 | | 3/2005 | Fortin et al. |
| 6,956,930 B1 | | 10/2005 | Cook |
| 7,031,714 B1 | | 4/2006 | Rayburn |
| 7,313,825 B2 | | 12/2007 | Redlich et al. |
| 7,317,927 B2 | | 1/2008 | Staton et al. |
| 2001/0028711 A1 | * | 10/2001 | Antonucci et al. ............ 379/245 |
| 2002/0098844 A1 | * | 7/2002 | Friedenfelds et al. ........ 455/445 |
| 2007/0055684 A1 | | 3/2007 | Stevens |
| 2008/0057919 A1 | | 3/2008 | Choi-Grogan et al. |
| 2009/0010398 A1 | | 1/2009 | Nelson et al. |

* cited by examiner

*Primary Examiner* — San Htun
*Assistant Examiner* — Erica Navar

(57) ABSTRACT

A system for effecting special treatment of emergency calls originating from a temporarily designated region; emergency calls originating from the region ordinarily being routed to a first emergency answering position. The system includes: (a) a geographic mapper; (b) a polygon manager coupled with the geographic mapper; at least one of the geographic mapper and the polygon manager unit being coupled with an emergency network handling the emergency calls; the polygon manager and the geographic mapper cooperating to effect designation of the region; and (c) a call routing unit coupled with the emergency network and coupled with at least one of the geographic mapper and the polygon manager. The call routing unit provides alternate call routing of the emergency calls originating in the region substantially while the region is designated to at least one other emergency answering position than the first emergency answering position.

20 Claims, 3 Drawing Sheets

SYSTEM AND METHOD FOR EFFECTING SPECIAL TREATMENT OF EMERGENCY CALLS ORIGINATING FROM A TEMPORARILY DESIGNATED REGION

CROSS REFERENCE TO RELATED APPLICATION

The present application is related to U.S. patent application Ser. No. 12/194,250 entitled "System and Method for Effecting Special Treatment of Emergency Service Calls Originating in a Temporarily Designated Region," filed 19 Aug. 2008, which is assigned to the current assignee hereof.

FIELD OF THE INVENTION

The present invention is directed to telecommunication systems, and especially to effecting special routing of emergency service calls originating in a temporarily designated region.

BACKGROUND OF THE INVENTION

A problem presented to a Public Safety Answering Point (PSAP; sometimes referred to as a Public Safety Answering Position) in handling emergency service calls received via an emergency telephone network may occur when multiple observers report the same incident such as, by way of example and not by way of limitation, immediately after an accident on an interstate or other highway. Numerous drivers passing by the locus of the accident driving in either direction on the interstate (or driving on cross roads intersecting the interstate) may dial 9-1-1 to report the accident. On very busy interstates it is possible that hundreds of cellular 9-1-1 calls may be made to report the same accident. Such a relatively sudden surge in 9-1-1 call volume can swamp a PSAP and occupy all of the call takers at the PSAP, thereby possibly preventing the call takers from responding to an emergency call regarding another emergency that is unrelated to the accident.

Prior art emergency telephone networks include cellular telephone switches connected to a 9-1-1 tandem telephone switch that routed an emergency service call to the correct PSAP based upon approximate location of the calling cellular phone. Prior to presenting the call to the 9-1-1 tandem switch, the cellular telephone switch queried a Mobile Positioning Center (MPC) or Gateway Mobile Location Center (GMLC) to obtain a pseudo telephone number that is selected based on the caller's approximate location. The 9-1-1 tandem switch was programmed to route any calls originating from the pseudo telephone number to a particular emergency service answering position or emergency call taking facility such as, by way of example and not by way of limitation, a Public Safety Answering Point (PSAP; sometimes referred to as a Public Safety Answering Position). In such a prior art system, the 9-1-1 tandem switch is unable to do anything other than route the call to the predetermined PSAP.

It would be useful if a PSAP call taker or operator could designate a geographic incident region substantially surrounding the location of an accident, identify emergency service calls originating within that designated incident region and provide alternate routing for calls originating from the incident region. By way of example and not by way of limitation, a PSAP operator could define a polygon by drawing the polygon on a map presentation. The alternate routing may be previously established to automatically effect routing emergency calls to alternate PSAPs in a previously predetermined priority order.

There is a need for a system and method for effecting alternate routing of emergency service calls originating from a temporarily designated region to divert emergency callers to one or more alternate PSAPs in order to reduce call volume to a single PSAP from a region associated with repeat reports of a single incident, or for another reason.

SUMMARY OF THE INVENTION

A system for effecting special treatment of emergency calls originating from a temporarily designated region; emergency calls originating from the region ordinarily being routed to a first emergency answering position. The system includes: (a) a geographic mapper; (b) a polygon manager coupled with the geographic mapper; at least one of the geographic mapper and the polygon manager unit being coupled with an emergency network handling the emergency calls; the polygon manager and the geographic mapper cooperating to effect designation of the region; and (c) a call routing unit coupled with the emergency network and coupled with at least one of the geographic mapper and the polygon manager. The call routing unit provides alternate call routing of the emergency calls originating in the region substantially while the region is designated to at least one other emergency answering position than the first emergency answering position.

A method for effecting special treatment of emergency service calls handled by an emergency telephone network and originating from a temporarily designated region; emergency service calls originating from an area including the region ordinarily being routed to a first emergency service answering position. The method including: (a) in no particular order: (1) providing a geographic mapping unit; (2) providing a polygon managing unit; and (3) providing a call routing unit; (b) in no particular order: (1) coupling the polygon managing unit with the geographic mapping unit; (2) coupling at least one of the geographic mapping unit and the polygon managing unit with the emergency telephone network; and (3) coupling the call routing unit with the emergency telephone network and with at least one of the geographic mapping unit and the polygon managing unit; (c) operating the polygon managing unit and the geographic mapping unit cooperatively to effect designation of the region; and (d) operating the call routing unit to provide alternate call routing to at least one other emergency service answering position than the first emergency service answering position of the emergency service calls originating in the region substantially while the region is designated.

It is, therefore, a feature of the present invention to provide a system and method for effecting alternate routing of emergency service calls originating from a temporarily designated region to divert emergency callers to one or more alternate PSAPs in order to For example and not limiting to a single purpose for use of the invention: reduce call volume to a single PSAP from a region associated with repeat reports of a single incident, or for another reason.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
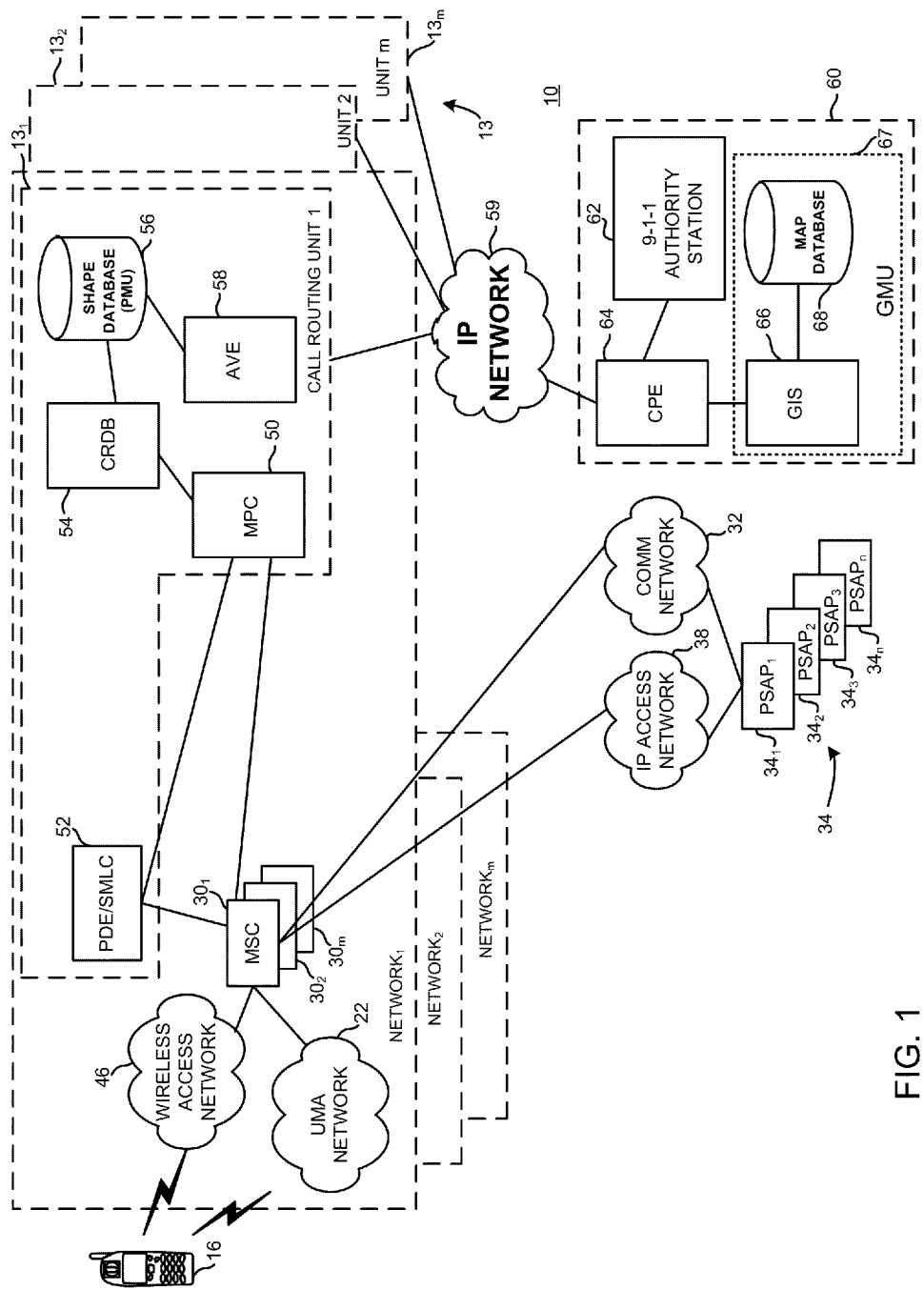
FIG. 1 is a schematic illustration of a system for effecting the present invention.

FIG. 1 is a schematic illustration of a system for effecting the present invention. In FIG. 1, a telecommunication system 10 includes a wireless calling unit or instrument 16 configured for effecting communications with a UMA (Unlicensed Mobile Access) Network 22, or a Wireless Access Network 46 or both of UMA Network 22 and Wireless Access Network 46. Wireless calling unit 16 may be embodied in a wireless calling device 16 including, by way of example and not by way of limitation, a mobile telephone, a Personal Digital Assistant (PDA) device, a "Smart" phone, an automatic crash notification (ACN) unit, a mobile radio device or a similar communication device. Wireless calling device 16 may effect communications with one or more network $Network_1$, $Network_2$, $Network_m$. The indicator "m" is employed to signify that there can be any number of networks in telecommunication system 10. The inclusion of three networks ($Network_1$, $Network_2$, $Network_m$) in FIG. 1 is illustrative only and does not constitute any limitation regarding the number of networks that may be included in the telecommunication system of the present invention. Throughout this description, use of a reference numeral using a generic subscript herein may be taken to mean that any respective member of the plurality of elements having the same reference numeral may be regarded as included in the description. Thus, by way of example and not by way of limitation, referring to Network m in describing FIG. 1 may be taken to mean that any network—$Network_1$, $Network_2$ or $Network_m$ (FIG. 1)—may be regarded as capable of employment as described. In order to avoid prolixity and cluttering the drawing, only one exemplary network ($Network_1$) is illustrated in detail in FIG. 1.

UMA Network 22 may be embodied in, by way of example and not by way of limitation, an Internet Protocol (IP) access network. UMA Network 22 may be configured for, by way of further example and not by way of limitation, employment in a Wi-Fi network, a Bluetooth network or another type of UMA (not shown in FIG. 1; understood by those skilled in the art of telecommunication network design). UMA Network 22 may include a link to a Voice over Internet Protocol (VoIP) phone instrument (not shown in FIG. 1; understood by those skilled in the art of telecommunication network design).

Wireless Access Network 46 may be embodied in, by way of example and not by way of limitation, one or more of a cellular network or a Personal Communication System (PCS) network employing any of several communication protocols including, by way of further example and not by way of limitation, GSM (Group Speciale Mobile; sometimes referred to as Global System for Mobile communications), Long Term Evolution (LTE), Universal Mobile Telecommunications System (UMTS) or another communication protocol. A communication protocol employed by Wireless Access Network 46 may be one or more of Time Division Multiple Access (TDMA), Code Division Multiple Access (CDMA) or another coding scheme.

Call routing units $13_m$ may be embodied in, by way of example and not by way of limitation, a network accessed using special number dialing, such as 9-1-1.

UMA Network 22 and Wireless Access Network 46 are coupled with a Mobile Switching Center (MSC) $30_1$ in $Network_1$. MSC $30_1$ is coupled with a communication network 32. Communication network 32 is coupled with at least one PSAP 34. At least one PSAP 34 may be embodied in PSAPs $34_1$, $34_2$, $34_3$, $34_n$. The indicator "n" is employed to signify that there can be any number of PSAPs in telecommunication system 10. The inclusion of four PSAPs $34_1$, $34_2$, $34_3$, $34_n$ in FIG. 1 is illustrative only and does not constitute any limitation regarding the number of PSAPs that may be included in the telecommunication system of the present invention. As will be understood by those skilled in the art of telecommunication network design, communication network 32 may be embodied in a plurality of networks; only one exemplary network is illustrated in FIG. 1 in order to avoid cluttering the drawing.

PSAPs 34 may be connected with MSC $30_1$ via an IP network 38 to permit communication between PSAP 34 and MSC $30_1$ without involving communication network 32.

$Network_1$, $Network_2$, $Network_m$ may each include a respective call routing system $13_1$, $13_2$, $13_m$. Each call routing system $13_m$ includes a Mobile Positioning Center (MPC) 50 coupled with a Position Determining Entity/Service Mobile Location Center (PDE/SMLC) 52 and coupled with MSC $30_m$. In the exemplary $Network_1$ illustrated in detail in FIG. 1, MPC 50, PDE/SMLC 52 and MSC $30_1$ cooperate to ascertain location of a calling unit 16. MPC 50 is also coupled with a Call Routing Data Base (CRDB) 54 to assist in identifying a proper PSAP $34_n$ as a first emergency service answering position to which emergency calls from the particular location of calling unit 16 are ordinarily routed. CRDB 54 is coupled with a shape data base 56. Shape data base 56 is coupled with an Authentication and Validation Engine (AVE) 58. AVE 58, CRDB 54 and Shape database 56 cooperate to provide the routing instructions to MPC A.

Each AVE 58 in each call routing unit $13_m$ is coupled with a 9-1-1 Authority Entity 60 via an IP network 59. 9-1-1 Authority entity 60 includes a 9-1-1 Authority Station 62 coupled with Customer Premise Equipment (CPE) 64. CPE 64 is coupled with IP network 59 and with a Geographic Information System (GIS) 66. GIS 66 is coupled with a map data base 68.

GIS 66 may be configured to cooperate with map data base 68 to operate as a geographic mapping unit (GMU) 67. Shape data base 56 may be configured to operate as a polygon managing unit (PMU) operated in cooperation with 9-1-1 Authority Station 62 and GMU 67 to effect designating a polygonal high volume origination region about a locus from which a high volume of emergency service calls originates. The region may be represented by a polygon on a map display for a user, such as at 9-1-1 Authority Station 62 or at one or more PSAP $34_n$. By way of example and not by way of imitation, such a high volume origination region may be designated after a predetermined number of emergency service calls is received within a predetermined time interval and which calls originate with a predetermined distance of each other. CRDB 54 may respond to designation of such a high volume origination region by routing emergency service calls to at least one alternate PSAP 34$_n$ substantially so long as the high volume origination region is designated. One or more of GMU 67, shape data base 56 and 9-1-1 Authority Station 62 may participate in attaching a finite life to the high volume origination region with an expiration time stamp attached to the high volume origination region or by another time-indicating tool. The designation of the high volume origination region (and an associated time-indicating tool, if any) may be expressed in a digital file to facilitate providing the designation to various entities in telecommunication system 10. One or more of GMU 67, shape data base 56, 9-1-1 Authority Station 62 and CRDB 54 may participate in presenting a list of alternate PSAPs 34$_n$ in a priority order.

As will be understood by one skilled in the art of emergency service network design, 9-1-1 Authority Entity 60 may be embodied in one or more of PSAP 34$_n$, and IP network 59 may be embodied in IP Access Network 38. As will also be understood by one skilled in the art of emergency service network design, each PSAP 34$_n$ may include one or more station for manning by an emergency service operation (not shown in detail in FIG. 1). Actions described above in connection with 9-1-1 Authority Station 62 may be performed by an operator occupying any respective station at any respective PSAP 34$_n$ that may be appropriately equipped for effecting such actions.

Calling unit 16 may wirelessly access UMA Network 22 to place an emergency 9-1-1 call to establish communication with PSAP 34 via MSC 30$_1$ and one or both of communication network 32 and IP network 38. Calling unit 16 may wirelessly access UMA Network 22 to place an emergency 9-1-1 call via a VoIP phone instrument (not shown in FIG. 1; understood by those skilled in the art of telecommunication network design), UMA Network 22, MSC 30$_1$ and one or both of communication network 32 and IP network 38.

Calling unit 16 may instead wirelessly access Wireless Access Network 46 to place an emergency 9-1-1 call with a PSAP 34$_n$ via MSC 30$_1$.

Calling unit 16 is capable of communicating in two or more of multiple modes, by way of example and not by way of limitation, via a communication link such as UMA Network 22 or Wireless Access Network 46. Calling unit 16 may access Wireless Access Network 46 to establish communication using any one or more of mode for which calling unit 16 is equipped, such as, by way of example and not by way of limitation, selected of a cellular network or a Personal Communication System (PCS) network employing selected of several communication protocols including, by way of further example and not by way of limitation, GSM (Group Speciale Mobile; sometimes referred to as Global System for Mobile communications), Long Term Evolution (LTE), Universal Mobile Telecommunications System (UMTS) or another communication protocol. Calling unit 16 may be configured for handling telecommunications using selected of Time Division Multiple Access (TDMA), Code Division Multiple Access (CDMA) or another coding scheme. Calling unit 16 may be further configured to communicate using other technologies such as, by way of further example and not by way of limitation, packetized communications such as General Packet Radio Service (GPRS) and text communications using Short Message Service (SMS).

Figure 2:
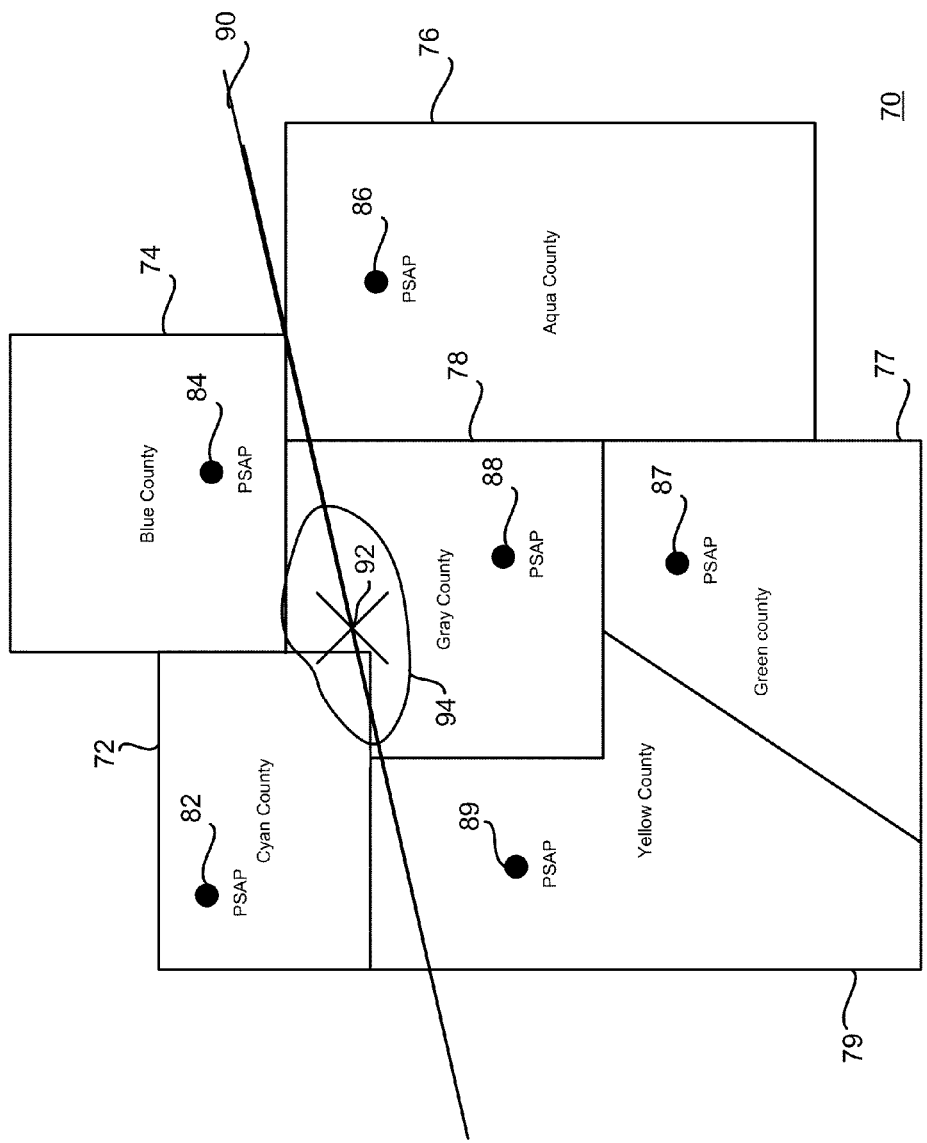
FIG. 2 is a schematic diagram illustrating application of a polygon to a geographic presentation.

FIG. 2 is a schematic diagram illustrating application of a polygon to a geographic presentation. In FIG. 2, a geographic area 70 includes a plurality of counties: Cyan County 72, Blue County 74, Aqua County 76, Green County 77, Gray County 78 and Yellow County 79. Each respective county has a respective PSAP: Cyan County 72 has a PSAP 82, Blue County 74 has a PSAP 84, Aqua County 76 has a PSAP 86, Green County 77 has a PSAP 87, Gray County 78 has a PSAP 88 and Yellow County 79 has a PSAP 89.

A road 90 such as, by way of example and not by way of limitation, an Interstate Highway traverses geographic area 70. An emergency service event, such as by way of example and not by way of limitation an automobile accident, occurs at an event locus 92 substantially on road 90.

Numerous drivers passing by event locus 92, driving in either direction on road 90 (or driving on cross roads intersecting road 90; not shown in FIG. 2) may dial 9-1-1 to report the accident. On very busy interstates it is possible that hundreds of cellular 9-1-1 calls may be made to report the same accident. Such a relatively sudden surge in 9-1-1 call volume can swamp a PSAP and occupy all of the call takers at the PSAP, thereby possibly preventing the call takers from responding to an emergency call regarding another emergency that is unrelated to the accident.

Referring to FIGS. 1-2 together, a 9-1-1 Authority Station 62 may access map data base 68 to obtain an electronic map of geographic area 70. Using a mouse or other data entry device, 9-1-1 Authority Station 62 may cooperate with shape data base 56 to draw a special treatment polygon 94 on an electronic map of geographic area 70 substantially surrounding event locus 92, thereby defining a special treatment region. Once the special treatment polygon or region has been defined, one or more of geographic mapping unit 67, shape data base 56, 9-1-1 Authority Station 62 and CRDB 54 may participate in attaching a finite life to the high volume origination region with an expiration time stamp attached to the high volume origination region or by another time-indicating tool and presenting a list of alternate PSAPs 34$_n$ in a priority order to which a call from a location within special treatment polygon 94 may be routed.

The special treatment region defined by special treatment polygon 94 and its associated special call treatment may persist only for a preset time interval, may require action by 9-1-1 Authority Station 62 to be terminated or may require renewal after a preset time interval has elapsed. When the special treatment region defined by special treatment polygon 94 and its associated special call treatment terminates, emergency calls may again be immediately routed to an appropriate PSAP 34$_n$ as occurred before the accident at event locus 92.

Other exemplary events that may, by way of example and not by way of limitation, advantageously employ the present invention include a VIP (Very Important Person) motorcade traversing an area, a bomb threat, a chemical spill, a festival, a planned demonstration, a fire or another event that may occasion a high volume of emergency service calls during a short time interval.

Figure 3:
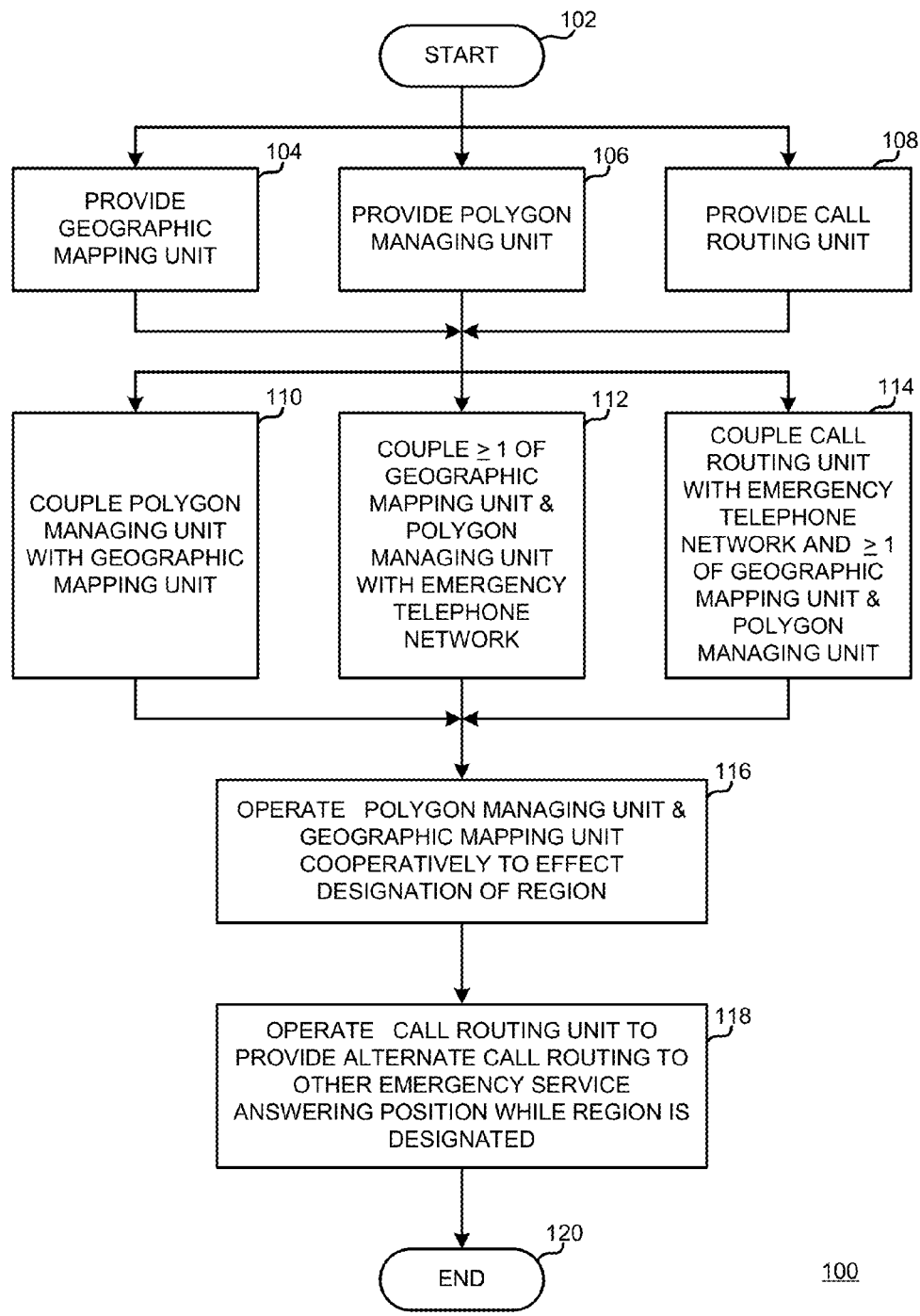
FIG. 3 is a flow diagram illustrating the method of the present invention.

FIG. 3 is a flow diagram illustrating the method of the present invention. In FIG. 3, a method 100 for effecting special treatment of emergency service calls handled by an emergency telephone network and originating from a temporarily designated region begins at a START locus 102. Emergency service calls originating from an area including the region are ordinarily routed to a first emergency service answering position.

Method 100 continues with, in no particular order: (1) providing a geographic mapping unit, as indicated by a block 104; (2) providing a polygon managing unit, as indicated by a block 106; and (3) providing a call routing unit, as indicated by a block 108.

Method 100 continues with, in no particular order: (1) coupling the polygon managing unit with the geographic mapping unit, as indicated by a block 110; (2) coupling at least one of the geographic mapping unit and the polygon managing unit with the emergency telephone network, as indicated by a block 112; and (3) coupling the call routing unit with the emergency telephone network and with at least one of the geographic mapping unit and the polygon managing unit, as indicated by a block 114.

Method 100 continues with operating the polygon managing unit and the geographic mapping unit cooperatively to effect designation of the region, as indicated by a block 116.

Method 100 continues with operating the call routing unit to provide alternate call routing to at least one other emergency service answering position than the first emergency service answering position of the emergency service calls originating in the region substantially while the region is designated, as indicated by a block 118.

Method 100 terminates at an END locus 120.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for effecting special treatment of an increased volume of emergency service calls originating from a locus; emergency service calls originating from an area including said locus ordinarily being routed to a first emergency service answering position; the system comprising:
   (a) a geographic mapping unit to effect display of an electronic map of said area including said locus;
   (b) a polygon managing unit to effect designation by an operator of a temporary region substantially surrounding said locus by drawing a special treatment polygon on said electronic map when a predetermined increased volume of emergency service calls is detected; said polygon managing unit coupled with said geographic mapping unit; at least one of said geographic mapping unit and said polygon managing unit being coupled with an emergency telephone network handling said emergency service calls; and
   (c) a call routing unit coupled with said emergency telephone network and coupled with at least one of said geographic mapping unit and said polygon managing unit; said call routing unit providing alternate call routing to at least one other emergency service answering position than said first emergency service answering position of said emergency service calls originating in said temporary region substantially while said temporary region is designated.

2. A system for effecting special treatment of an increased volume of emergency service calls originating from a locus as recited in claim 1 wherein said at least one other emergency answering position is included in a predetermined list of alternate emergency answering positions.

3. A system for effecting special treatment of an increased volume of emergency service calls originating from a locus as recited in claim 2 wherein said predetermined list identifies said alternate emergency service answering position in a priority order.

4. A system for effecting special treatment of an increased volume of emergency service calls originating from a locus as recited in claim 1 wherein said temporary region is designated after a predetermined number of emergency service calls are received within a predetermined time interval and originating within a predetermined distance of each other.

5. A system for effecting special treatment of an increased volume of emergency service calls originating from a locus as recited in claim 1 wherein at least one station in said first emergency service answering position is authorized to initiate said designation of said temporary region and said providing said alternate call routing.

6. A system for effecting special treatment of an increased volume of emergency service calls originating from a locus as recited in claim 4 wherein said at least one other emergency answering position is included in a predetermined list of alternate emergency answering positions.

7. A system for effecting special treatment of an increased volume of emergency service calls originating from a locus as recited in claim 6 wherein said predetermined list identifies said alternate emergency service answering position in a priority order.

8. A system for reducing numbers of repeat emergency service calls relating to an incident arriving via an emergency communication network at a first emergency call taking facility; said incident occurring from an area with an incident locus; the system comprising:
   (a) at least one geographic mapping unit to effect display of an electronic map of said area with said locus;
   (b) at least one polygon managing unit to effect designation by an operator of a temporary incident region substantially surrounding said locus by drawing a special treatment polygon on said electronic map when a predetermined increased volume of emergency service calls is detected; at least one of said at least one geographic mapping unit and said at least one polygon managing unit being coupled with said emergency communication network; and
   (c) a routing unit coupled with said emergency communication network and coupled with at least one of said at least one geographic mapping unit and said at least one polygon managing unit; said routing unit being responsive to said repeat emergency service calls originating from said temporary incident region while said temporary incident region is designated to enable alternate call routing of emergency service calls originating from said incident locus to at least one emergency call taking facility other than said first emergency call taking facility.

9. A system for reducing numbers of repeat emergency service calls relating to an incident arriving via an emergency communication network at an emergency call taking facility as recited in claim 8 wherein said at least one polygon managing unit effects attaching an expiration time stamp to said temporary incident region.

10. A system for reducing numbers of repeat emergency service calls relating to an incident arriving via an emergency communication network at an emergency call taking facility as recited in claim 8 wherein said at least one other emergency call taking facility is included in a predetermined list of alternate emergency call taking facilities; said predetermined list identifying said alternate emergency call taking facilities in a priority order.

11. A system for reducing numbers of repeat emergency service calls relating to an incident arriving via an emergency communication network at an emergency call taking facility as recited in claim 8 wherein said temporary incident region is designated after a predetermined number of emergency service calls are received within a predetermined time interval and originating within a predetermined distance of each other.

12. A system for reducing numbers of repeat emergency service calls relating to an incident arriving via an emergency communication network at an emergency call taking facility as recited in claim 8 wherein at least one station in said first emergency call taking facility is authorized to initiate said enabling said alternate call routing.

13. A system for reducing numbers of repeat emergency service calls relating to an incident arriving via an emergency communication network at an emergency call taking facility as recited in claim 11 wherein said at least one polygon managing unit effects attaching an expiration time stamp to said temporary incident region.

14. A system for reducing numbers of repeat emergency service calls relating to an incident arriving via an emergency communication network at an emergency call taking facility as recited in claim 13 wherein said at least one other emergency call taking facility is included in a predetermined list of alternate emergency call taking facilities; said predetermined list identifying said alternate emergency call taking facilities in a priority order.

15. A method for effecting special treatment of an increased volume of emergency service calls handled by an emergency telephone network and originating from a locus; emergency service calls originating from an area including said locus ordinarily being routed to a first emergency service answering position; the method comprising:
   (a) in no particular order:
      (1) providing a geographic mapping unit;
      (2) providing a polygon managing unit; and
      (3) providing a call routing unit;
   (b) in no particular order:
      (1) coupling said polygon managing unit with said geographic mapping unit;
      (2) coupling at least one of said geographic mapping unit and said polygon managing unit with said emergency telephone network; and
      (3) coupling said call routing unit with said emergency telephone network and with at least one of said geographic mapping unit and said polygon managing unit;
   (c) operating said geographic mapping unit to effect display of an electronic map of said area including said locus;
   (d) operating said polygon managing unit and said geographic mapping unit cooperatively to effect designation by an operator drawing a special treatment polygon on said electronic map of a temporary region substantially surrounding said locus when a predetermined increased volume of emergency service calls is detected; and
   (e) operating said call routing unit to provide alternate call routing to at least one other emergency service answering position than said first emergency service answering position of said emergency service calls originating in said temporary region substantially while said temporary region is designated.

16. A method for effecting special treatment of an increased volume of emergency service calls handled by an emergency telephone network and originating from a locus as recited in claim 15 wherein said at least one other emergency answering position is included in a predetermined list of alternate emergency answering positions.

17. A method for effecting special treatment of an increased volume of emergency service calls handled by an emergency telephone network and originating from a locus as recited in claim 16 wherein said predetermined list identifies said alternate emergency service answering position in a priority order.

18. A method for effecting special treatment of an increased volume of emergency service calls handled by an emergency telephone network and originating from a locus as recited in claim 15 wherein said temporary region is designated after a predetermined number of emergency service calls are received within a predetermined time interval and originating within a predetermined distance of each other.

19. A method for effecting special treatment of an increased volume of emergency service calls handled by an emergency telephone network and originating from a locus as recited in claim 18 wherein said at least one other emergency answering position is included in a predetermined list of alternate emergency answering positions.

20. A method for effecting special treatment of an increased volume of emergency service calls handled by an emergency telephone network and originating from a locus as recited in claim 19 wherein said predetermined list identifies said alternate emergency service answering position in a priority order.

* * * * *